United States Patent

[11] 3,554,442

| [72] | Inventor | Erik Landberg<br>Monte Carlo, Monaco |
|---|---|---|
| [21] | Appl. No. | 806,961 |
| [22] | Filed | Mar. 13, 1969 |
| [45] | Patented | Jan. 12, 1971 |
| [73] | Assignee | Aktiebolaget Fellingsbro Verkstader<br>Fellingsbro, Sweden<br>a corporation of Sweden |
| [32] | Priority | Apr. 30, 1968 |
| [33] | | Sweden |
| [31] | | No. 5857/68 |

[54] VALVES
4 Claims, 6 Drawing Figs.

| [52] | U.S. Cl. | 237/59 |
|---|---|---|
| [51] | Int. Cl. | F24d 3/00 |
| [50] | Field of Search | 237/59, 8, |
| | (Inquired); 236/34.5, 137, (Inquired) | |

[56] References Cited
UNITED STATES PATENTS

| 2,113,775 | 4/1938 | Van Vulpen | 237/40 |
| 2,211,573 | 8/1940 | McGrath | 237/8 |
| 2,419,630 | 4/1947 | Cruzan | 236/34.5 |
| 2,422,924 | 6/1947 | Puster | 236/34.5 |

*Primary Examiner*—Edward J. Michael
*Attorney*—Flynn & Frishauf

ABSTRACT: A central heating radiator control valve comprising a valve housing with an inlet, a main outlet and a branch outlet, and a valve member slidably mounted in the housing for movement between two terminal positions in one of which flow of fluid from the inlet to the main outlet is a minimum and in the other of which flow of fluid from the inlet to the branch outlet is a minimum.

3,554,442
PATENTED JAN 12 1971
SHEET 1 OF 2
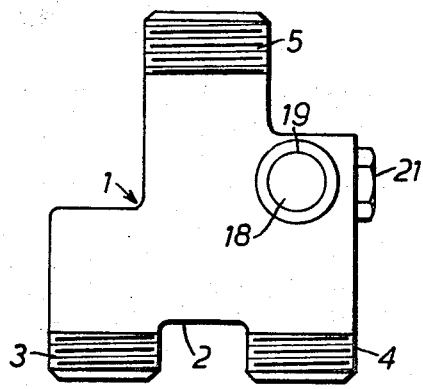
FIG./.
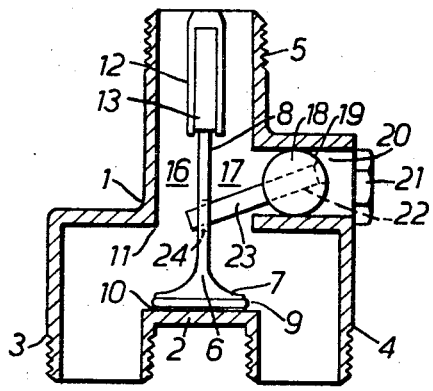
FIG.2.
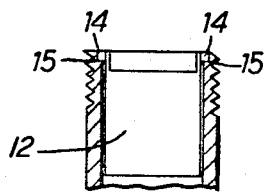
FIG.3.
ERIK LANDBERG
INVENTOR
BY
ATTORNEYS

PATENTED JAN 12 1971 3,554,442

VALVES

The present invention is concerned with improvements in or relating to valves.

For example, a previously proposed valve for the control and regulation of fluid media, flowing through a single main line comprises a valve housing provided with a movable valve body, said housing being connectable on the one hand to the single line so that the fluid flow through said line passes through the valve housing and on the other to a branch line, going for example to a radiator.

Control valves of this kind for radiators connected into single-line systems, have hitherto been provided with a valve cone rotatably assembled in the valve housing, and this does not achieve complete regulation of the total flow through the main line of the single-line system.

It is an object of the present invention, therefore, to provide an improved valve, by means of which the total flow through the system can be regulated between 0 and 100 percent.

The invention provides a valve for the control and regulation of the flow of a fluid which valve comprises (a) a valve housing comprising an inlet portion, a main outlet portion and a branch outlet portion, and (b) a valve body slidably mounted in the housing for adjusting movement between two terminal positions, in one of which in the operation of the valve flow of fluid from the inlet portion to the main outlet portion is a minimum and in the other of which flow of fluid from the inlet portion to the branch outlet portion is a minimum.

The fluid may be, for example, liquid or gaseous, e.g. water or steam.

It is another object of the invention to provide a fluid system, e.g. a central heating system, including such a valve.

There now follows a description, to be read with reference to the accompanying drawings, of an embodiment of the invention. This description is given by way of example of the invention only and not by way of limitation thereof.

In the drawings:

FIG. 1 is a side elevation of a valve;

FIG. 2 is a section through the valve of FIG. 1;

FIG. 3 is a section through the top part of the valve of FIG. 1;

Figure 4:
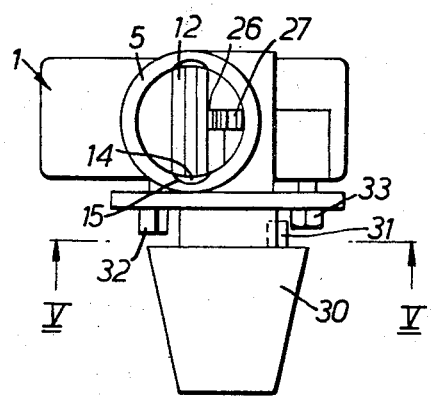
FIG. 4 is a plan view of a valve according to the present invention.

The valve of the first embodiment (FIGS. 1 to 3) is suitable for use as a control valve for radiators in central heating systems of the single line type and comprises a one-piece valve housing generally marked 1 which on account of its shape can be made of any suitable material such as brass or similar alloys, by hot forging or diecasting. Considered in detail, the valve housing 1 is in the form of a U-shaped, hollow, preferably bored out component 2, inlet and main outlet leg portions 3 and 4 respectively of which are designed to enable the valve to be included in a single main flow line which, upstream of the valve, is in communication with the leg portion 3 and leads thereto from e.g. a supply of central heating fluid and, downstream of the valve, is in communication with the leg portion 4. The housing 1 also has a branch outlet portion 5 in the form of a pipe connection for connecting the valve to a branch line which, if it goes to a radiator, is split into two passages by a spiral partition (not shown).

The valve housing 1 contains a valve body 6 comprising a piston element 7 with a surrounding sealing ring 9, and a shank 8 in one piece with said piston element 7; the shank 8 preferably has plane-parallel sides. The valve body 6, which is slidably mounted in the branch portion 5 and can move axially between two terminal positions defined by a face 10 and a valve seat 11, is located by a locating element 12 located in the upper part of the branch portion 5, which element 12 contains a groove 13, cooperating with the shank portion 8 of the valve body in a manner which is shown in FIG. 2. The control element 12 has its upper end provided with two diametrically opposite lips 14 which engage in corresponding openings 15 in the upper part of the branch portion 5 (FIG. 3) in order to hold the element 12 nonrotationally in the branch portion 5. The element 12 and the shank portion 8 also serve to split the branch portion 5 into two passages 16, 17 which, when the valve is assembled on a radiator, correspond with the relevant passages in the branch line to the radiator.

Between the two said terminal positions, the valve body 1 can be adjusted to any intermediate position by means of an arrangement as shown in FIG. 2, which is in the form of a rotatable shaft 18 carrying a hand wheel (not shown); the shaft 18 extends through a bore 19 into a bore 20 in the valve housing 1, the latter bore being closed off by a screw 21. That part of the shaft 18 which is located in the bore 20 contains a bore 22 receiving a pin 23. The pin 23 extends at right angles from the shaft 18 and engages in a aperture 24 in the shank portion 8 of the valve body. In the terminal position shown in FIG. 2, the piston element 7 bears against the face 10 and fluid flows from the leg portion 3 into the passage 16 of the branch portion 5 but not directly from the leg portion 3 into the leg portion 4; however, fluid from the radiator flows through the passage 17 of the branch portion 5 into the leg portion 4. When said shaft 18 is rotated through the medium of the hand wheel from the position shown in FIG. 2 the piston element 7 is lifted from the face 10 by a distance which because of the relatively limited angle of rotation, is substantially proportional to the angle of rotation of the shaft 18. By rotating the spindle through an appropriate angle, the piston element 7 can thus be moved into a position in which it bears against the other valve seat 11, this being formed by a bottom internal part of the component 2. In this terminal position fluid flows from the leg portion 3 into the leg portion 4 but not into branch portion 5. It will be realized that the valve body 6 can be adjusted to any intermediate position between the two terminal positions; in any such position fluid flows from the leg portion 3 directly into the leg portion 4 and into the branch portion 5 in proportions according to the specific position of the valve body 6. Thus a control facility of between 0 and 100 percent of the total flow rate, can be achieved, and, independently of the position of the valve body 6, the flow resistance of the valve as a whole is substantially constant.

Figure 5:
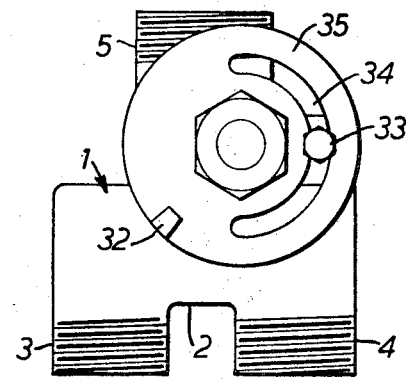
FIG. 5 is a section taken on the line V-V of FIG. 4.
Figure 6:
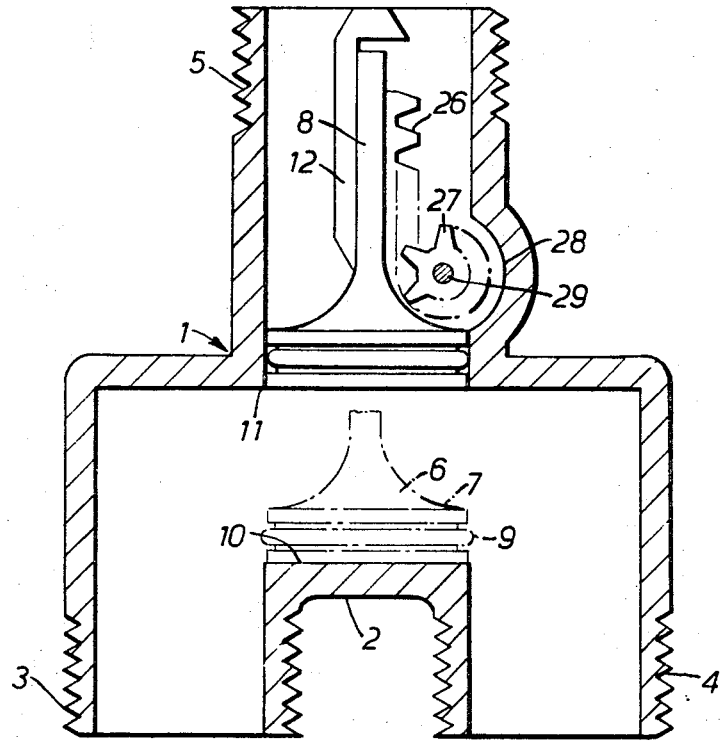
FIG. 6 shows a similar section to that of FIG. 2 through the valve of FIGS. 4 and 5.

In the second embodiment (FIGS. 4—6) the valve is also suitable for use as a control valve for radiators in heating systems of the single-line type, and in many respects resembles the valve shown in FIGS. 1 to 3. As shown in FIG. 6, a shank portion 8 of a valve body 6 carries a toothed rack formation 26 which cooperates with a gear 27 carried on a spindle 29 rotatably mounted in a bore 28 in a valve housing. The said spindle also carries a handwheel 30 at its free end, projecting out of the valve housing, and this handwheel carries a stop 31 arranged to cooperate with a lip 32 to limit the movement of the valve body in the downward axial direction of a branch portion 5, and to determine a bottom terminal position of the valve body. The lip 32 is arranged on a rotatable disc 35 comprising a slot 34, the disc 35 being located between the handwheel and the valve housing 1. The disc 35 can be secured in any desired position by means of a screw 33, and it position adjusted by releasing the screw 33, rotating the disc and retightening the screw 33. By securing the disc 35 in an appropriate position it is therefore possible to set the bottom terminal position (FIG. 6) of the valve body, in a desired fashion, at the time of installation of the valve, e.g. so that there is at all times a certain bleed rate, directly from the leg portion 3 to the leg portion 4, this proportion of the fluid thus not being directed to the radiator.

The valve embodying the invention can be used in any situation where a valve of this kind is required, for example in heating systems with a supply and return line to each radiator.

I claim:

1. A valve for the control and regulation of the flow of a fluid which valve comprises:

a. a valve body;
   b. a valve housing containing the valve body and comprising an inlet portion, a main outlet portion, a branch outlet portion, and means engageable by the valve body to close the inlet portion from the main outlet portion;

c. means for mounting the valve body in the housing for linear movement between two terminal positions, in one of which flow of fluid from the inlet portion to the branch outlet portion is a maximum, flow of fluid from the inlet portion to the main outlet portion is a minimum and the valve body serves to split the branch outlet portion into flow and return passages, and in the other of which the branch outlet portion is isolated from the inlet portion and from the main outlet portion and flow of fluid from the inlet portion to the main outlet portion is a maximum;

d. means for moving the valve body between said terminal positions;

e. stop means for determining said one terminal position; and f. means for adjusting said stop means to set said one terminal position from zero spacing between said valve body and said engageable means according to the required value of said minimum flow of fluid from the inlet portion to the main outlet portion, which minimum flow is thus settable from zero upwardly.

2. A fluid flow system comprising a single main flow line and a valve according to claim 1 included in the main flow line which, upstream of the valve, is in communication with the inlet portion of the valve and, downstream of the valve, with the main outlet portion of the valve.

3. In a central heating system, a valve for the control and regulation of the flow of hot water to a radiator which valve comprises:

a. a valve body comprising a generally planar shank and a head transverse of the plane of the shank;

b. a valve housing containing the valve body and comprising an inlet portion, a main outlet portion parallel and coextensive with the inlet portion, and a branch outlet portion opposed to the inlet portion and to the main outlet portion, and the housing defining a face between the inlet portion and the main outlet portion engageable by the valve head to close the inlet portion from the main outlet portion;

c. slide means extending across the branch outlet portion for mounting the shank of the valve body in the housing for linear sliding movement between two terminal positions, in one of which flow of water from the inlet portion to the branch outlet portion is a maximum, flow of water from the inlet portion to the main outlet portion is a minimum, and the valve body and slide means serve to split the branch outlet portion into coextensive flow and return passages on either side of the plane of the valve shank, and in the other of which the valve head closes the branch outlet portion to isolate it from the inlet portion and from the main outlet portion and flow of water from the inlet portion the main outlet portion is a maximum;

d. means for moving the valve body between said terminal positions;

e. stop means for cooperating with said moving means to determine said one terminal position; and f. means for adjusting said stop means to set said one terminal position from zero spacing between said valve head and said face according to the required value of said minimum flow of water from the inlet portion to the main outlet portion, which minimum flow is thus settable from zero upwardly.

4. The combination of claim 3, wherein the moving means comprises a rack integral with the valve shank, a pinion, a spindle mounting the pinion in operative engagement with the rack, and a knob mounted on the spindle to rotate the pinion.